(12) United States Patent     (10) Patent No.:   US 12,601,680 B2

Kjaer            (45) Date of Patent:     Apr. 14, 2026

---

(54) METHOD OF AND A SYSTEM FOR DETERMINING A PARAMETER OF A FLUID

(71) Applicant: Radiometer Medical ApS, Brønshøj (DK)

(72) Inventor: Thomas Kjaer, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 188 days.

(21) Appl. No.: 18/261,298

(22) PCT Filed: Jan. 14, 2022

(86) PCT No.: PCT/EP2022/050749
§ 371 (c)(1),
(2) Date: Jul. 13, 2023

(87) PCT Pub. No.: WO2022/152847
PCT Pub. Date: Jul. 21, 2022

(65) Prior Publication Data
US 2024/0077418 A1     Mar. 7, 2024

(30) Foreign Application Priority Data
Jan. 15, 2021    (EP) ..................................... 21151857

(51) Int. Cl.
*G01N 21/41*      (2006.01)
*G01N 21/27*      (2006.01)

(52) U.S. Cl.
CPC ....... *G01N 21/4133* (2013.01); *G01N 21/274* (2013.01)

(58) Field of Classification Search
CPC .. G01N 21/4133; G01N 21/274; G01N 21/31; G01N 2021/0346
See application file for complete search history.

(56) References Cited

U.S. PATENT DOCUMENTS 4,660,974 A * 4/1987 Machler ................. G01N 21/45
                                           356/128
9,322,773 B2 * 4/2016 Coates ................... G01N 21/35
(Continued)

FOREIGN PATENT DOCUMENTS

CN       105092513 A     7/2018
JP       2005257319 A * 9/2005 ......... G01N 21/3151
(Continued)

OTHER PUBLICATIONS

International Search Report of International Application No. PCT/EP2022/050749, dated Apr. 25, 2022 (3 pages).
(Continued)

*Primary Examiner* — Tarifur R Chowdhury
*Assistant Examiner* — Kemaya Nguyen
(74) *Attorney, Agent, or Firm* — FBT Gibbons LLP

(57) ABSTRACT

A system (10) for determining a refractive index of a sample fluid or a concentration of a component in the sample fluid comprises a transparent sensing element (12) with a plurality of pores (122) for receiving a fluid. The pores reflect or scatter radiation emitted by a radiation emitter (14) of the system differently depending on the refractive index of the fluid. The system comprises one or more detectors (16) for detecting the reflected and/or scattered radiation. The refractive index of the sample fluid is determined based on the detected scattered and/or reflected radiation when the sample fluid is fed into the pores, the corresponding detected scattered and/or reflected radiation when first and second calibration fluids having predetermined refractive indexes and predetermined absorptions at at least two wavelengths are fed into the pores, said predetermined refractive indexes and said predetermined absorptions. Alternatively, a concentration of a component in the sample fluid absorbing at a given wavelength may be determined based on the
(Continued)

Figure 1:
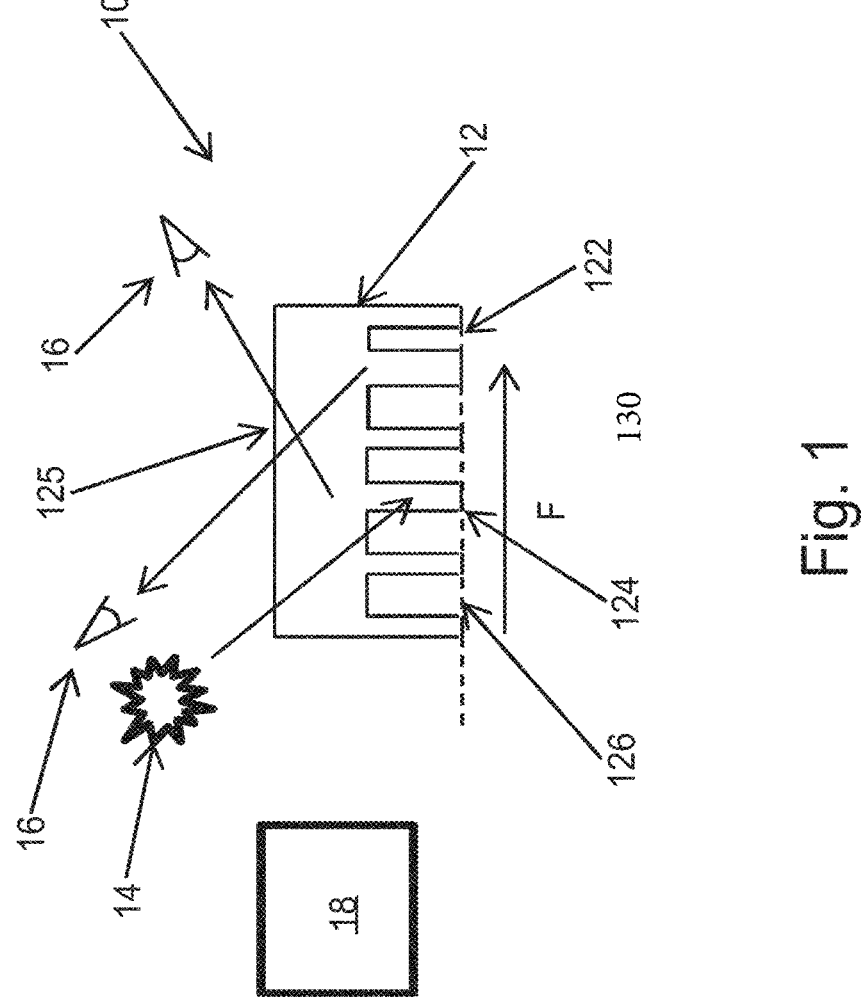

detected scattered and/or reflected radiation, a predetermined refractive index of the sample fluid, a predetermined refractive index and a predetermined absorption at said wavelength of a calibration fluid, and the detected scattered and/or reflected radiation when the calibration fluid is fed into the pores.

15 Claims, 7 Drawing Sheets

(56) References Cited

U.S. PATENT DOCUMENTS

| | | | |
|---|---|---|---|
| 10,830,695 | B2 | 11/2020 | Perkins |
| 11,175,467 | B2 * | 11/2021 | Meng .................... G01N 21/85 |
| 2003/0193662 | A1 | 10/2003 | DiFoggio et al. |
| 2006/0285115 | A1 | 12/2006 | Tomaru |
| 2008/0227188 | A1 * | 9/2008 | Wimberger-Friedl ....................... G01N 21/645 |
| | | | 435/288.7 |

| | | | |
|---|---|---|---|
| 2016/0313242 | A1 * | 10/2016 | Margalit ................... G01J 4/00 |
| 2017/0212043 | A1 * | 7/2017 | Daly .................... G01N 21/274 |
| 2021/0115385 | A1 * | 4/2021 | Snow .................... C12M 41/26 |
| 2023/0193662 | A1 | 6/2023 | Yuan |

FOREIGN PATENT DOCUMENTS

| | | | |
|---|---|---|---|
| JP | | 2018533012 A | 11/2018 |
| JP | | 2021518910 A | 8/2021 |
| WO | | 2017085180 A1 | 5/2017 |
| WO | WO 2019/197308 A1 | | 10/2019 |

OTHER PUBLICATIONS

Written Opinion of the International Search Authority for International Application No. PCT/EP2022/050749 (9 pages).

Indian First Examination Report for IN 2023170486639, mailed on Oct. 13, 2025.

Japanese Notice of Refusal for JP 2023-543114, mailed May 8, 2020.

* cited by examiner

METHOD OF AND A SYSTEM FOR DETERMINING A PARAMETER OF A FLUID

This application is a national stage filing under 35 U.S.C. § 371 of International Application No. PCT/EP2022/050749, filed on Jan. 14, 2022, which claims priority to European Patent Application No. 21151857.6, filed on Jan. 15, 2021. The contents of these applications are each incorporated herein by reference in their entirety.

The present invention relates to a method and a system for determining a parameter of a fluid and in particular a method and a system for determining a parameter in a fluid present in a transmissive element having a number of pores and where a calibration is made using a refractive index of a calibration fluid.

Relevant technology may be seen in US2006/285115, U.S. Ser. No. 10/830,695, WO2019/197308 and WO2017/085162.

In a first aspect, the invention relates to a method of determining a refractive index of a fluid, the method comprising the steps of:

a) obtaining a first optical signal from a sensing element having a plurality of pores comprising a first fluid having a first predetermined refractive index and a predetermined first absorption at at least a first and a second wavelength, b) obtaining a second optical signal from the sensing element, where the pores comprise a second fluid having predetermined second absorptions at the least first and second wavelengths and a second, predetermined refractive index, the second predetermined refractive index being different from the first predetermined refractive index, c) obtaining a third optical signal from the sensing element, where the pores comprise a third fluid, and d) determining a refractive index of the third fluid based on the first, second and third optical signals, the first and second predetermined absorptions and the first and second refractive indexes.

According to this aspect of the invention, the desired parameter of the fluid is the refractive index. As will be described further below, the sensing element with the pores is well suited for such determination as the pores act to reflect or scatter the radiation, where this scattering or reflection depends on the refractive index of the fluid.

A fluid may be a liquid, gas, suspension or the like. A fluid may be used for calibrating a detection set-up or system and/or be a sample. A parameter of the fluid may be desired determined. The term "sample" may refer to whole blood sample, where "liquid" then may be the portion which may negotiate its way into the pores, such as the plasma fraction of whole blood, spinal cord fluid, urine, pleura, ascites, wastewater, a pre-prepared fluid for any kind of injection, fluids with a constituent possible to detect by spectroscopy, or a gas such as air, carbon dioxide containing gas, carbon monoxide containing gas. Naturally, a sample not comprising portions filtered away by the pore size may form the liquid.

The term "whole blood" refers to blood composed of blood plasma, and cellular components. The plasma represents about 50%-60% of the volume, and cellular components represent about 40%-50% of the volume. The cellular components are erythrocytes (red blood cells), leucocytes (white blood cells), and thrombocytes (platelets). Preferably, the term "whole blood" refers to whole blood of a human subject but may also refer to whole blood of an animal. Erythrocytes constitute about 90%-99% of the total number of all blood cells. They are shaped as biconcave discs of about 7 μm in diameter with a thickness of about 2 μm in an un-deformed state. The erythrocytes are highly flexible, which allows them to pass through very narrow capillaries, reducing their diameter down to about 1.5 μm. One core component of erythrocytes is hemoglobin which binds oxygen for transport to the tissues, then releases oxygen and binds carbon dioxide to be delivered to the lungs as waste product. Hemoglobin is responsible for the red color of the erythrocytes and therefore of the blood in total. Leucocytes make up less than about 1% of the total number of all blood cells. They have a diameter of about 6 to about 20 μm. Leucocytes participate in the body's immune system e.g. against bacterial or viral invasion. Thrombocytes are the smallest blood cells with a length of about 2 to about 4 μm and a thickness of about 0.9 to about 1.3 μm. They are cell fragments that contain enzymes and other substances important to clotting. In particular, they form a temporary platelet plug that helps to seal breaks in blood vessels.

The terms "blood plasma" or "plasma" refer to the liquid part of the blood and lymphatic fluid, which makes up about half of the volume of blood (e.g. about 50%-60% by volume).

Plasma is devoid of cells. It contains all coagulation factors, in particular fibrinogen and comprises about 90%-95% water, by volume. Plasma components include electrolytes, lipid metabolism substances, markers, e.g. for infections or tumors, enzymes, substrates, proteins and further molecular components.

The term "wastewater" refers to water that has been used, as for washing, flushing, or in a manufacturing process, and so contains waste products and/or particles and is thus not suitable for drinking and food preparation.

According to the first aspect, a first fluid is present in a plurality of pores of a sensing element, where the first fluid has a first predetermined refractive index and a predetermined absorption at at least a first and a second wavelength. Often, more than two wavelengths are used in the determination, and sometimes an absorption spectrum of the fluid is known within a wavelength interval. The first fluid may be provided in or at the pores by a feeding element, such as a pump or the like. The first fluid may be fed to or into the pores using capillary action or similar automatic processes. Further alternatively, the first fluid may be automatically provided in the pores, such as during production of the pores.

Usually, an optical signal is obtained by launching radiation of at least the first and second wavelengths toward the pores and detecting launched radiation reflected and/or scattered by the pores. A pore may be closed at one end and at the same time have a single opening to the surroundings of the sensing element, such as into a flow channel provided for guiding the fluid to the pores. Pores may be separate or interconnected. The pores may be more or less parallel and extend away from a surface at which the openings are provided.

Pumps, valves, flow channels, fluid containers and the like may be provided for sequentially providing the first and second fluids to the pores.

The sensing element may comprise a translucent slab or element and potentially a reflecting layer applied to a front side of the translucent slab. The translucent slab contains a plurality of pores, preferably small, dead end pores, which may extend from a front side, through the reflective layer, if provided, into the translucent slab. A radiation source and a detector may be arranged to optically probe the content of the pores, and to generate a corresponding signal output which may be used for determining the parameter of the fluid.

Each of the small pores preferably has an opening through which it can communicate with a fluid space, such as at a side of the translucent slab. The pores thus penetrate the reflecting layer, if present, to allow for fluid communication between the pores and the fluid space. The pores may extend from the respective opening at the front side into the translucent slab, such as in a direction towards the backside. When the pores are "dead end", this will mean that the pores end within the translucent slab so that the pores do not continue all the way through the translucent slab to the backside or to any common reservoir or recipient inside the slab. Then, the pores may be only in fluid communication with the fluid space at the front side of the translucent slab. Note that in some embodiments the dead end pores can be crisscrossing and at least some of the pores may thus be connected to each other forming an X-shape, a Y-shape, a V-shape, or similar interconnected shapes. Such a configuration is equally considered as dead end, since the pores are only filled from the front side and no significant net mass transport passing through the pores occurs under operation, even if they cross each other. By appropriately dimensioning the opening of the pores at the front side it is possible to prevent larger components of the fluid, such as red blood cells of a whole blood sample or debris in the fluid on the front side of the sensing element, from entering the pores, while allowing relevant components in e.g. the plasma fraction of the whole blood sample to enter the pores, wherein relevant components are substances present in the plasma fraction of the whole blood sample and that are to be measured/detected using the sensor. In particular, protein, bilirubin and carbon dioxide are relevant components.

The pores may extend into the sensing element or slab from one surface thereof and the radiation launched toward the pores from a direction at a non-zero angle to that surface and/or at a non-perpendicular angle to a mean direction of the pores. Also or alternatively, the detector may be configured to receive radiation directed toward the detector along a non-zero angle to that surface and/or at a non-perpendicular angle to a mean direction of the pores. In this manner, the number of reflections/scatterings may be kept rather low, allowing more radiation to reach the detector.

Under operation, in step a) the pores, such as the front side of the translucent slab may be contacted with the first fluid, if the fluid is not already present in the pores. While the first fluid is in the pores, it is optically probed, so that a first optical signal is provided or detected.

After the measurement, the first fluid may be discharged from the pores, such as through the same openings.

Before or after that step, a second fluid is fed to the pores and optically probed.

Optical probing may comprise, and/or optical signals may be based on, launching radiation of at least the first and second wavelengths toward the pores. Radiation may be reflected by the pores into different directions including a direction toward a detector, so that part of the radiation is detected. The detected radiation may be reflected any number of times. The radiation detected may be reflected/scattered toward the detector by second pores of the plurality of pores.

It may be preferred that the radiation is launched on to first pores of the plurality of pores and that the radiation detected stems from second pores of the plurality of pores.

The first and second pores may be the same pores, completely different pores, or some of the first pores may also be second pores.

It may be preferred that a large overlap exists between the first and second pores, such as if more than 50%, such as more than 75%, such as more than 90% of the first pores are also second pores, and/or if more than 50%, such as more than 75%, such as more than 90% of the second pores are also first pores. It may be preferred that the overlap is smaller, so that no more than 50% of the first pores are second pores and/or no more than 50% of the second pores are first pores.

The detector may then be adapted to generate a signal representative of the detected radiation and/or the optical signal. The optical signal may be the reflected/scattered radiation, such as the radiation reflected/scattered toward or detected by the detector. The optical signal may be taken as an output of the detector based on such radiation. Finally, an optical signal may be the result of an analysis of such output or reflected radiation. The optical signal may represent an intensity change of the radiation due to absorption in the pores and scattering/reflection of the pores.

Preferably, the radiation is launched toward the same pores, and the detection is configured to receive radiation from the same pores throughout the useful life time of the sensing element. Thus, the first and second pores, as mentioned above, are preferably the same during the method or the useful lifetime of the sensing element. Alternatively, or additionally, it may be desired that relative directions and positions of the radiation emitter (such as a radiation outputting element), the sensing element and the detector (such as a radiation receiving element) are at least substantially the same. In this manner, the radiation is launched toward the same pores from the same angle(s) and the radiation is collected from the same pores and from the same angle(s). It is noted that altering e.g. the angle of incidence of launched radiation will alter the optical structures seen by the radiation so that the resulting detected radiation may vary for the same incident wavelength(s), intensity and for the same fluid in the pores.

The content of the pores can conveniently be probed optically from the back side of the translucent slab opposite to the surface where the openings of the pores are seen. If the sample comprises larger components, the optical probing may thus be selectively performed only on the sub-sample, the liquid, inside the pores.

Incident radiation may be guided/directed to the pores to ensure that the radiation traverses the pores and interacts with the fluid therein. Preferably, the probing radiation is sent into the pores at an oblique incidence with respect to a longitudinal axis of the pores and/or surface normal on the plane of the surface at which the pores openings are seen, to ensure that the light traverses the pores comprising the fluid to be probed, thereby ensuring a maximum of optical interaction path length.

Light emerging from the pores in response to the irradiation has interacted with the fluid in the pores and thus carries information on the fluid. The emerging radiation and/or a signal representative of the emerging radiation may then be analyzed with respect to that information in order to develop a value representative of e.g. the analyte content in the third fluid. The radiation may display an intensity change comprising absorption caused by analytes in the fluid as well as a "loss" or "gain" created by scattering/reflection of radiation at the pores. Analysis may include spectrally analyzing the emerging/detected radiation, and/or signal/data processing, e.g. for comparing the obtained signal with signals obtained on calibration/reference liquids, such as the first fluid, for noise filtering, for applying corrections, and for removing artefacts.

In a particularly advantageous embodiment, it is the contents of protein in blood plasma, being the third fluid, which is probed optically, e.g. by determining the refractive index of the third fluid. Protein does not provide large radiation absorption but takes part in the definition of the refractive index of the plasma.

It may be desired that a cross-sectional area of the pores corresponds to a circle with a diameter being within 50% of the wavelength of the radiation, such as within 25% of the wavelength, so that the pores may act like scattering particle-like elements. The wavelength of the radiation may be a minimum wavelength used in the determination, a maximum wavelength or a mean wavelength, for example. The scattering efficiency of the pores thus will depend on the refractive index difference between the fluid in the pores and the material of the sensing element forming the pores. The larger the refractive index difference, such as if the fluid is a gas such as air, the higher the scattering.

The first and second fluids have predetermined refractive indexes which are different. Thus, the scattering caused by the pores will be different. This is utilized as a calibration for determination of the refractive index of the third fluid. The radiation lost, i.e. an intensity change, between the radiation emitter and the detector is due to absorption and scattering/reflection. Thus, when the absorption(s) of the first and second fluids at the at least two wavelengths are known, the contribution caused by the scattering/reflection due to the refractive index of the fluids may be determined and calibrated for.

Radiation lost might also be radiation gain if absorption is smaller than a gain from RI changes.

When the absorption of one fluid is known at a first and a second wavelength, when also the refractive index of that fluid is known and when the absorption of another fluid is known at the first and second wavelengths and the refractive index of that fluid is known, the relation at the first wavelength between the received radiation which is scattered/reflected and the radiation which is absorbed may be determined. Also, the same relation may be determined at the second wavelength. From these relations, the amount of radiation scattered and/or the amount of radiation absorbed may be determined for the third fluid, whereby it will be possible to determine both the absorption from a multitude of compounds and the refractive index of the third fluid. This may require as many wavelengths as compounds investigated (and data of the compounds absorption spectrum as a function of wavelength) plus one (for the RI determination).

Thus, it is preferred that each of steps a), b) and c) comprises:

launching radiation at each of the first and second wavelengths to the sensing element and
    determining an intensity of radiation at each of the first and second wavelengths from the sensing element and
    wherein step d) is performed based also on the determined intensities.

In general, a wavelength may be a wavelength interval in which the wavelength is provided. Often, single wavelengths are not desired or obtainable, where radiation is then emitted and/or received, such as after being filtered, within a desired wavelength interval.

Naturally, more wavelengths than the first and second wavelengths may be used. Thus, radiation comprising a third wavelength may be launched on to the sensor element and radiation at or within that wavelength may also be detected and the result of the detection used in the determination.

In fact, this calibration may be even more general. In usual spectrometers or sensing elements for determining concentrations based on the radiation absorption of a component of a sample/fluid or the like, the calibration is based on the absorption of calibration fluids at different wavelengths. The wavelengths are selected based on the components sought for. It is desired that a calibration fluid absorbs at each wavelength. However, on the other hand it is desired to reduce the number of calibration fluids.

The present finding makes such calibration easier. From the calibration, the intensity change, such as the sum effect of absorption and scattering may be determined at all relevant wavelengths. The contribution from scattering may be determined from a fluid having no or no significant absorption at these wavelengths. The absorption may be converted into a sensitivity, which is the absorption divided by the concentration of the absorbing component and a molar extinction coefficient of the component. Thus, from the determination of the scattering contribution, such as the intensity change created thereby, at two wavelengths and an absorption determination at one of the wavelengths, the absorption at the other wavelength may be assumed or determined from the scattering contributions. The relative difference between the absorption contributions may be assumed to be the same as that observed between the scattering contributions.

The first fluid may be used for calibrating the method and may be a particular calibration fluid but may also have other functions, such as a rinsing fluid used prior to contacting the front side with the second or third fluids, where the third fluid is the actual unknown fluid, which in some embodiments is a whole blood sample or fluid that is to be analyzed. In fact, the first fluid may be a gas and the second fluid may be a fluid with the above properties. Thereby, the pores can be 'primed' with a prefill of a liquid that is compatible with the second/third fluid, such as a whole blood sample, and in particular a liquid that is compatible with the plasma phase if the fluid is whole blood, such as an aqueous solution commonly used for rinse, calibration and/or quality control purposes in blood analyzers. Typical rinse liquids used for e.g. wash-out in whole blood analyzer systems may be used as such a liquid. Rinse liquids are aqueous solutions comprising $K+$, $Na+$, $Cl-$, $Ca2+$, $O2$, pH, $CO2$, and $HCO3-$ in concentrations corresponding to human plasma. Non-limiting examples of suitable solutions commonly used for rinse, calibration and/or quality control purposes are given further below.

When the whole blood sample or fluid is then brought in contact with the front side surface that is primed with a plasma compatible liquid/fluid compatible fluid, a representative sub-sample, the fluid, of components in the plasma phase of the whole blood sample or of the fluid is extracted and transferred in a very efficient and gentle manner by means of diffusion of the relevant components into the prefilled pore. In particular, any concentration gradient in the content of the analyte between the later fluid and the former fluid in the pores drives a diffusive transfer, thereby producing in the pores a sub-sample, the fluid, with an analyte concentration representative of the analyte concentration in the fluid.

As mentioned, it may be desired that the first fluid is a gas, such as ambient air. Air has a low refractive index which may be desirable in the calibration. Then, the pores, such as a front side of the sensing element, may be dry. In addition, it may be desired that an inside surface of the pores is hydrophilic, thereby allowing extraction of the next fluid, when water based, into the pores by means of capillary forces.

The sensing element may be single-use in the sense that when all fluids have been introduced therein, the sensing element is not used again. Especially when one fluid is a gas and another a liquid, it may be desired to not re-use the sensing element, as this would require the complete removal of all liquid from the pores before re-use is possible.

It is noted, however, that the optical signals from the first and second fluids may be reused for a number of third fluids, so that the sensing element may be used for more than a single third fluid.

Clearly, also another parameter of the third fluid may be determined, when the third fluid comprises a concentration of a substance, and wherein step d) further comprises determining a concentration of the substance in the third fluid. This determination may be made in the same manner as described further below in relation to the second aspect of the invention.

Further according to one embodiment of a sensing element, a cross-sectional dimension of the openings of the pores is about 1 μm or less, about 800 nm or less, preferably about 500 nm or less, or even about 400 nm or less, and/or a length of the pores in an axial direction along the pores is less than 100 μm, less than 50 μm, preferably less than 30 μm, or about 25 μm.

By using pores having an opening in the plane of the front side of the translucent slab with a maximum cross-sectional dimension of about 1 μm or less, or preferably in the submicron range, such as about 800 nm or less, such as about 500 nm or less, or even about 400 nm or less, any cellular components including erythrocytes, leucocytes, and thrombocytes (platelets), are prevented from entering the pores, when the first or second fluids are whole blood.

Further, pores with an opening having a cross-sectional-dimension of about 500 nm or less have an increased sensitivity as compared to larger pores, such as pores having an opening with a cross-sectional dimension of about 800 nm or above but having the same total pore volume/volume porosity.

Most preferably, the pores have a minimum opening with a respective minimum pore volume to allow for the efficient extraction of a sufficiently large sub-sample that can still be probed with an acceptable signal to noise ratio. Advantageously, the pores have an opening of about 30 nm or more, or 50 nm or more, or 100 nm or more, or about 200 nm or more.

Suitable pores may be produced e.g. from transparent polymer membranes with so-called track-etched pores, similar to those available from the company IT4IP (IT4IP s.a./avenue Jean-Etienne Lenoir 1/1348 Louvain-la-Neuve/Belgium) with the modification that the pores are closed at one end. Through-going pores in the membranes may be closed e.g. by laminating a backing sheet to the backside of the porous membrane, or by decelerating the ions such that the ion-bombardment tracks, and thus the pores etched following these tracks, stop within the transparent polymer membrane to form dead end pores. The membrane is typically backed by a stiff transparent element to provide adequate mechanical strength to the translucent slab or sensing element.

The sensing element is preferably made of a material that does not absorb radiation at the one or more wavelengths and at the same time it is preferably possible to produce the dead-end pores in the material e.g. by track etching the material. Material suitable for this is polyethylene terephthalate (PET or PETE) or an analogue of PET (polyethylene terephthalate polyester (PETP or PET-P)) or a polycarbonate (PC). The sensing element may comprise a hydrophilic coating of e.g. polyethylene glycol (PEG) to increase the diffusion into the pores.

The hydrophilic coating may be chosen according to the use of the sensing element. In some use cases, the sensing element will never dry out, once it is in use and it therefore only needs to be hydrophilic at startup. For other uses of the sensing element, it needs coating that keeps it hydrophilic permanently for allowing the sensing element to dry out and still be useable afterwards when the sensing element is re-wetted for a further use.

Further according to one embodiment of a sensing element, a porosity of a given volume of the translucent slab comprising pores is between 50% and 5% by volume, between 30% and 10% by volume, or about 15% by volume.

The pores create porosity in the sensing element (or in a given region of the sensing element) with a corresponding front side surface area over which the openings of the pores are distributed. The porosity may be characterized in terms of the volume of the voids created in the sensing element by the pores, i.e. the pore volume, wherein the pore volume is referred to the volume of the sensing element penetrated by the pores. This volume is here defined as the volume between the front side area over which the pores are distributed and the identical parallel area shifted into the sensing element by the maximum depth of penetration of the pores into the sensing element as seen in an axial direction perpendicular to the front side of the sensing element.

In addition thereto, the porosity may be further characterized in terms of the integrated pore volume, which is equal to the fluid volume that is available for optical probing. The pore volume may conveniently be expressed as an equivalent pore volume depth DELTA, which is the pore volume referred to the corresponding front side area over which the pore openings are distributed. Accordingly, the porosity of the sensing element can be converted into an equivalent pore volume depth DELTA as follows. The pores having an opening within a given front side area A have a total pore volume V. The equivalent pore volume depth is then calculated as the total pore volume divided by the given front side area: $DELTA=V/A$.

Advantageously according to some embodiments, an equivalent pore volume depth DELTA is less than 20 μm, or less than 15 μm, or less than 10 μm, or in the range from 3 μm to 5 μm, wherein the equivalent pore volume depth DELTA is defined as the total volume of the pores V divided by the front side area A over which the openings of the pores are distributed.

In the situation where a fluid is whole blood and only the serum is of interest, a small sub-sample with a representative concentration of relevant components is obtained. A small sub-sample volume is desirable to promote a fast sub-sample exchange, thereby reducing response time of the sensing element, and cycle time of measurements using the sensing element. A small sub-sample volume is further desirable in order to avoid effects of depletion of boundary layers of a plasma fraction in a whole blood sample close to the front side of the sensing element. Such depletion effect may otherwise occur in small, still standing samples, where e.g. red blood cells may obstruct an efficient diffusive exchange of relevant components from the volume of the whole blood sample towards the boundary layer at the front side of the sensing element, if the equivalent pore volume depth exceeds a critical value.

Preferably, an equivalent pore volume depth DELTA is at least 1 μm, alternatively at least 2 μm, or in the range from 3 μm to 5 μm, wherein the equivalent pore volume depth is defined as above. A larger fluid volume may be desirable to achieve a better signal-to-noise level due to a larger fluid volume contributing to the optically probed information on the relevant components in the second fluid.

Further according to some embodiments, a useful compromise between reducing response time, reducing cycle time, and/or avoiding depletion effects in small still standing amounts of fluid on the one hand, and a required or desired signal-to-noise ratio on the other hand is found for an equivalent pore volume depth DELTA in the range from 1 μm to 20 μm, preferably in the range from 2 μm to 10 μm or at about 4 μm-5 μm.

As mentioned above, the method may be used to not determine the refractive index of the third fluid but a concentration of a component thereof, such as from an absorption, determined in step c) of this component. Then, step d) could instead determine the concentration while taking into account the contribution by the refractive index of the third fluid.

An aspect of the invention thus relates to a method of determining a concentration of a fluid, the method comprising the steps of:

a) obtaining a first optical signal from a sensing element having a plurality of pores comprising a first fluid having a first predetermined refractive index and predetermined first absorptions at at least a first and a second wavelength, b) obtaining a second optical signal from the sensing element, where the pores comprise a second fluid having predetermined second absorptions at the at least first and second wavelengths and a second, predetermined refractive index, the second refractive index being different from the first refractive index, c) obtaining a third optical signal from the sensing element, where the pores comprise a third fluid, and d) determining a concentration of a component of the third fluid based on the first, second and third optical signals, the first and second predetermined absorptions and the first and second refractive indexes.

The determination may comprise determining the refractive index of the third fluid. Alternatively, the refractive index contribution may be compensated for. The component may absorb radiation at one of the first and second wavelengths, and step c) may comprise determining the absorption at the first and/or second wavelength, and this absorption may be utilized in step d).

As mentioned above and below, steps a) and b) may comprise launching radiation comprising the first and second wavelength on to the sensor element and determining an intensity of radiation at or around the first and second wavelengths received from the sensor element, where the determined intensities are used in step c).

Naturally, all considerations, embodiments and the like of all other aspects of the invention may be equally relevant in relation to this aspect.

Another aspect of the invention relates to a method of determining a parameter of a fluid, the method comprising the steps of:

a) obtaining a first optical signal from a sensing element having a plurality of pores comprising a first fluid having a first predetermined refractive index and a predetermined absorption at at least one of one or more wavelengths, b) obtaining a second optical signal from the sensing element, where the pores comprise a second fluid having a second predetermined refractive index, the second refractive index being different from the first refractive index, and c) determining, based on the first and second optical signals, the first and second refractive indexes, and the predetermined absorption, a concentration of a component of the second fluid, the component absorbing radiation at at least one of the one or more wavelengths.

In this context, the parameter may be any parameter of the fluid, such as a concentration of a component thereof or a refractive index, such as a parameter which may be determined using radiation, such as based on the component's absorption at a wavelength different from the one wavelength. A usual parameter is a concentration of a component of the liquid, such as a molecule, drug, constituent or the like. Concentrations may be determined on the basis of an absorption of radiation at one or more particular wavelengths, as is known.

On the other hand, the refractive index of the fluid may also affect the manner in which the radiation travels in the detection setup and thus could be compensated for.

In a particularly advantageous embodiment, it is the coloring of blood plasma, being the second fluid, by Hemoglobin that is probed optically, e.g. by using spectrally resolved absorption measurements, or by measuring the spectrally integrated absorption over a predetermined bandwidth within a spectral range indicative of the presence of bilirubin in the second liquid, such as within a spectral range of wavelengths 380 nm-750 nm, such as within a spectral range of wavelengths 400 nm-540 nm, or at about 416 nm and/or at about 455 nm and/or about 525 nm.

The first and second fluids have predetermined refractive indexes which are different. Thus, the scattering caused by the pores will be different. This is desired taken into account in the determination of the concentration of the component of the second fluid, as this concentration is often determined based on intensities of radiation within the different wavelengths. Then, a larger scattering may, depending on the actual optical set-up, result in more or less radiation being detected for the same sample or fluid.

It is again noted that scattering and reflection, within reason, is wavelength independent at least to a degree where the wavelength sensitivity in some cases needs not be taken into account in the determination. Should the wavelengths used be so different, or should the desired precision be so high, the wavelength dependency of the scattering/reflection at different refractive indexes may be determined and taken into account for the individual wavelengths.

Having determined the first and second optical signals, such as having detected the radiation from the optical probing of the first and second fluids, a concentration of a component of the second fluid may be determined based on the radiation detected as well as the refractive indexes of the first and second fluids.

It is preferred that steps a) and b) comprises:
launching radiation at the at least one wavelength and at another wavelength to the sensing element and
determining an intensity of radiation at the at least one wavelength and the other wavelength from the sensing element and
wherein step c) is based also on the determined intensities.

Usually, the absorption at two wavelengths are desired to determine a concentration of a component. For a number of components, it is often desired to have at least as many wavelengths as components to be determined and often more, in order to be able to solve the matrix resulting in the concentrations for the individual components.

The wavelengths may be selected so that some components absorb more at some wavelengths than others, but this is standard to the skilled person.

The first fluid, the sensing element and the pores, as well as the fluid providing, radiation launching and radiation detection may be as described in relation to the first aspect of the invention. The small dead end pores allow for a very efficient and fast fluid take-up, and if the fluid comprises larger molecules or portions, swift extraction of the sub-sample, for optical probing by means of capillary forces and/or diffusion.

All embodiments, situations, examples and the like of the first aspect of the invention are equally relevant to the second aspect of the invention.

In this aspect of the invention, the refractive indexes of the first and second fluids are predetermined and different. The first and second fluids may be selected based on a number of parameters, such as their refractive index, any absorption at the one or more wavelengths, their type (liquid, gas, suspension), whether they are homogeneous or comprise large components which are not desired in the pores, and the like.

Also, the wavelength(s) may be selected based on any absorption thereof of the sensing element, and the fluids. Also, the wavelength(s) may be adapted to the pore size(s), or vice versa, as described above.

As mentioned also in relation to the first aspect, it is preferred that the same pores receive radiation from the radiation emitter and may scatter/reflect radiation toward the detector, and that the angles of launched radiation and detected radiation are the same, irrespective of which fluid is in the pores.

In general, it may be desired that the first and second refractive indexes are sufficiently different. Thus, it may be desired that the second refractive index is at least 1.05 times, such as at least 1.1 times, such as at least 1.15 times, such as at least 1.2 times, such as at least 1.25 times, such as at least 1.3 times the first refractive index.

As mentioned above, it may be desired that the first fluid is a gas. In that manner, a large refractive index difference may be obtained between the first and second fluids. This gas may be ambient air or a gas having a non-zero absorption at at least one of the wavelengths. In this manner it is possible to determine both the refractive index sensitivity as well as an absorption sensitivity of the system without starting up (wetting) the sensor unit. It may also be desired to determine or control any humidity of the ambient air, as water vapour therein may cause undesired absorption at some radiation wavelengths.

Surprisingly for whole blood and plasma samples and many other samples, the large RI difference between air and water/sample/fluid allows to assign a known RI to the sample/fluid, even though the RI of the sample/fluid, which is normally between 1.33 and 1.35 (corresponding to the usual protein concentration variation in blood), is not known more precisely than that. This is due to the much larger RI difference from water (RI=1) to that of the sample/fluid (RI=1.33-1.35). Then, as the RI of the sample is known to within ⅓₃ of the difference from water to the sample/fluid, a rather precise calibration may be obtained.

A third aspect of the invention relates to a system for determining a refractive index of a fluid, the system comprising:

a sensing element having a plurality of pores, a controllable radiation provider configured to launch radiation of one or more wavelengths toward the pores, a detector configured to detect launched radiation reflected/scattered by the pores and output corresponding information, a controllable fluid providing element configured to provide fluid to the pores, and a controller configured to control the radiation provider and the fluid providing element and to:

control the detector to obtain a first optical signal when the pores comprise a first fluid having a predetermined first refractive index and predetermined first absorptions at at least a first wavelength and a second wavelength, control the detector to obtain a second optical signal when the pores comprise a second fluid having predetermined second absorptions at at least the first and the second wavelength and a second predetermined refractive index, the second refractive index being different from the first refractive index, control the detector to obtain a third optical signal when the pores comprise a third fluid, and determine a refractive index of the third fluid, based on the first, second and third optical signals, the first and second absorptions, and the first and second refractive indexes.

The third aspect relates to the first aspect of the invention and all considerations relating to the fluids, wavelengths, refractive indexes, pores, sensing element and the like are equally relevant in this context.

The radiation provider is controllable. In this context, this may be in order to select the wavelength(s) or wavelength interval(s) desirably emitted. Alternatively, the intensity emitted within one, several of or all wavelength(s) may be controlled. Further alternatively, the launching of the radiation on to the pores may be controlled, such as which pores, the position of the pores in the sensing element, the area or volume thereof receiving the radiation, the angle of incidence or the like.

The radiation provider may comprise one or more radiation emitters, such as lasers, laser diodes, LEDs, OLEDs or the like, and one or more optical elements for transporting the radiation to the first pores. The optical elements may comprise filters, collimators, lenses, light guides or the like. Often, these optical elements will define which pores are the first pores.

The detector may comprise one or more detecting elements, such as photo diodes, and optics for transporting radiation from the second pores to the detecting element(s). These optics may comprise lenses, collimators, filters, radiation guides or the like. Often, these optics will define which pores are the second pores. Filters may be used for dividing the received radiation into different wavelengths or wavelength intervals which may then be individually detected. Alternatively, the detector may be configured to determine a spectrum of the radiation received.

Preferably the radiation provider and detector maintain a fixed relation to the sensing element during sensing and between the optical probing of the different fluids. In this manner, the sensing element may be configured to receive radiation from the same pores over time.

The detector is configured to output information corresponding to received radiation. This corresponding radiation may correspond to a total intensity received, intensities determined at different wavelengths, such as the one or more wavelengths or the like. This may be in the form of individual values or a spectrum of the radiation received, for example.

The fluid providing element is controllable to provide desired fluid to the pores. As mentioned above, some fluids may already be provided in the pores, such as from manufacture of the sensing element. The fluid providing element may comprise individual receptacles for individual fluids. Alternatively, a common receptacle may be provided where an operator sequentially feeds the desired fluid to the fluid providing element which may then feed the selected fluid to the pores. The fluid feeding element may also, in the same step or in an earlier step, remove a former fluid from the pores.

The controller may be any type of controller, such as a processor, FPGA, DSP, software controlled, hardwired or any combination thereof. The processor may be remote from the sensing element or may be an integral part of the system. The processor may be divided into different portions performing different tasks. The processor may communicate with the radiation emitter, the detector, and the fluid feeding element in any manner, such as via wires or wirelessly.

The controller may then control the system to perform the above method and/or the method of the first aspect of the invention.

As described in relation to the first aspect of the invention, the refractive index of the third fluid may be determined based on the first, second and third information, the first and second absorptions and the first and second refractive indexes.

As indicated above, it may be desired that the controller is configured to determine, in the determination, a concentration of a substance in the third fluid. In this context, the controller may be configured to control the fluid providing element to feed a third fluid comprising a concentration of the substance. Then, the controller may be configured to determine, in the determination, a concentration of the substance in the third fluid.

The controller preferably is configured to:

control the radiation provider to launch radiation at each of the first and second wavelengths to the sensing element, control the detector to determine:

as at least part of the first optical signal, a first intensity of radiation at each of the first and second wavelengths from the sensing element and as at least part of the second optical signal, a second intensity of radiation at each of the first and second wavelengths from the sensing element, and determine the refractive index based also on the determined first and second intensities.

A fourth aspect of the invention relates to a system for determining a parameter of a fluid, the system comprising:

a sensing element having a plurality of pores, a controllable radiation provider configured to launch radiation of one or more wavelengths toward the pores, a detector configured to detect launched radiation reflected by the pores and output corresponding information, a controllable fluid providing element configured to feed fluid to the pores, and a controller configured to control the radiation provider and the fluid providing element and to:

control the detector to obtain a first optical signal when the pores comprise a first fluid having a predetermined first refractive index and a predetermined first absorption at at least one of one or more wavelengths, control the detector to obtain a second optical signal when the pores comprise a second fluid having a second predetermined refractive index, the second refractive index being different from the first refractive index, and determine, based on the first and second optical signals, the predetermined first absorption as well as the first and second refractive indexes, a concentration of a component of the second fluid, the component absorbing radiation at at least one of the one or more wavelengths.

This aspect corresponds to the second aspect of the invention, and all considerations made in that respect are equally relevant for this aspect.

Naturally, all considerations made in relation to the third aspect of the invention relating to the controller, the fluids, the fluid providing element, the radiation provider, the detector, the sensing element, and the like are equally relevant in this context.

The controller preferably is configured to:

control the radiation provider to launch radiation at the at least one wavelength and at another wavelength to the sensing element, control the detector to determine:

as at least part of the first optical signal, a first intensity of radiation at the at least one wavelength and at the other wavelength from the sensing element and as at least part of the second optical signal, a second intensity of radiation at the at least one wavelength and at the other wavelength from the sensing element and determine the component based also on the determined intensities.

Having received the information relating to the radiation received when the first, second and third fluids was in the pores, the concentration may be determined, based on the first and second information, the first and second absorptions as well as the first and second refractive indexes, where the concentration is a concentration of a component of the second fluid, the component absorbing radiation at at least one of the one or more wavelengths. This is described further above.

It may be desired that the first refractive index is at least 1.05 times the second refractive index.

It may be desired that the fluid providing element comprises a plurality of fluid containers and a flow path from each fluid container to the pores. In this manner, the fluid providing element may control the flow of at least some of the fluids.

The system may also comprise a plurality of sensing elements, so that a sensing element may, after determination of a refractive index or a concentration of a component, be discarded and a new sensing element used for a subsequent determination.

It may be desired that the sensing element has, as the first fluid, a gas, such as ambient air, in the pores.

As mentioned above, it is preferred that the radiation emitter launches radiation toward the same pores, at least within 10%, from which the detector is configured to receive radiation.

A final aspect relates to method of determining a parameter of a fluid, the method comprising the steps of:

a) obtaining a first optical signal from a sensing element having a plurality of pores comprising a first fluid having a first predetermined refractive index and a first predetermined absorption at at least one of one or more wavelengths, b) obtaining a second optical signal from the sensing element, where the pores comprise a second fluid having a second predetermined absorption at at least one of the one or more wavelengths index, and c) determining, based on the first and second optical signals, the first and second absorptions and the predetermined refractive index, a refractive index of the second fluid.

Clearly, all embodiments, situations and considerations relating to all other aspects of the invention are equally valid in relation to this aspect of the invention.

In this aspect, the knowledge of the radiation absorption and scattering caused by the refractive index of the fluid in the pores may be used for determining a refractive index of an unknown fluid. As mentioned above, the refractive index may be a representation of a component which may not absorb radiation at least at a wavelength used in the determination, so that the refractive index may be used for arriving at knowledge relating to this component.

Figure 2:
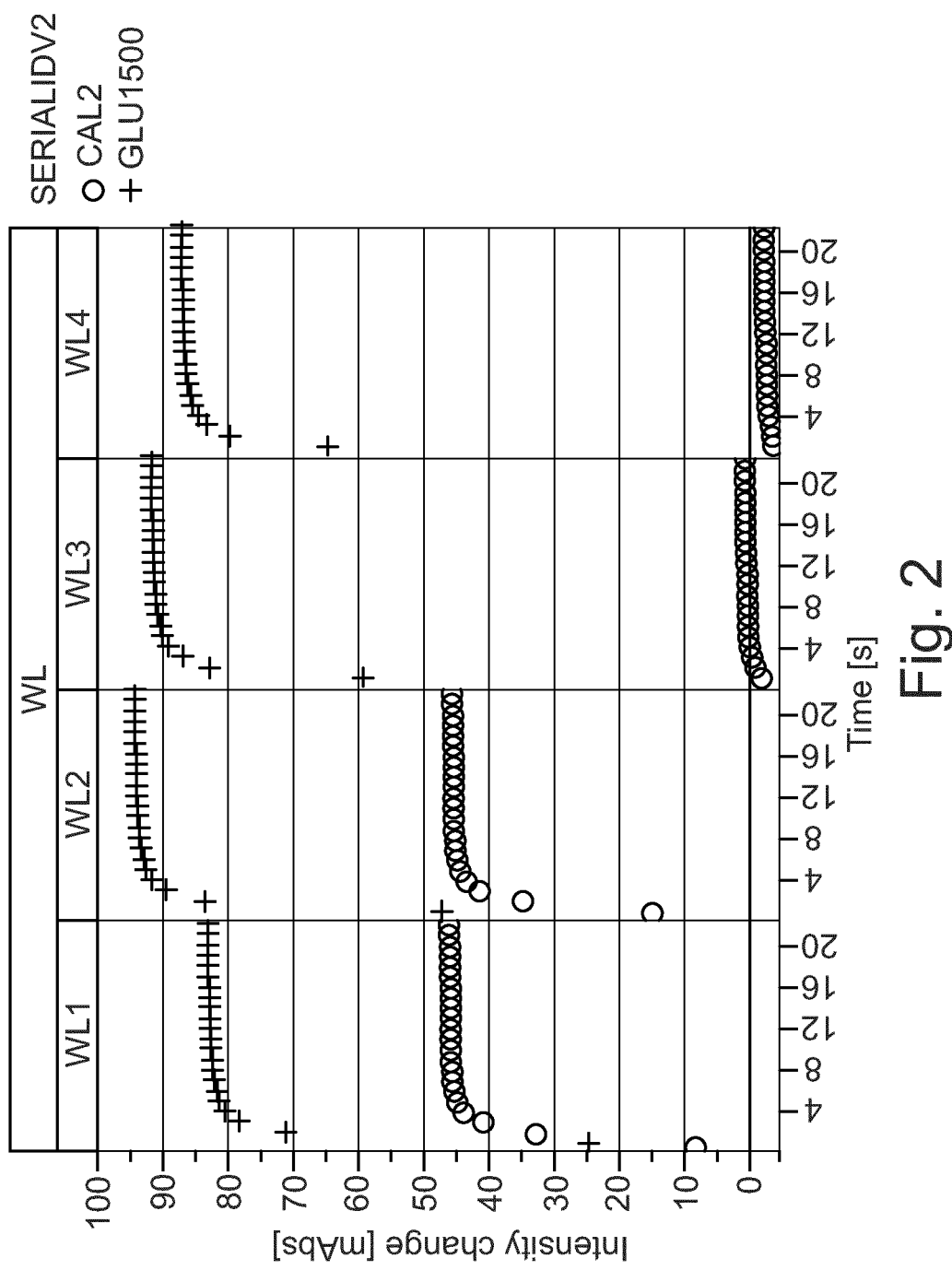
Figure 3:
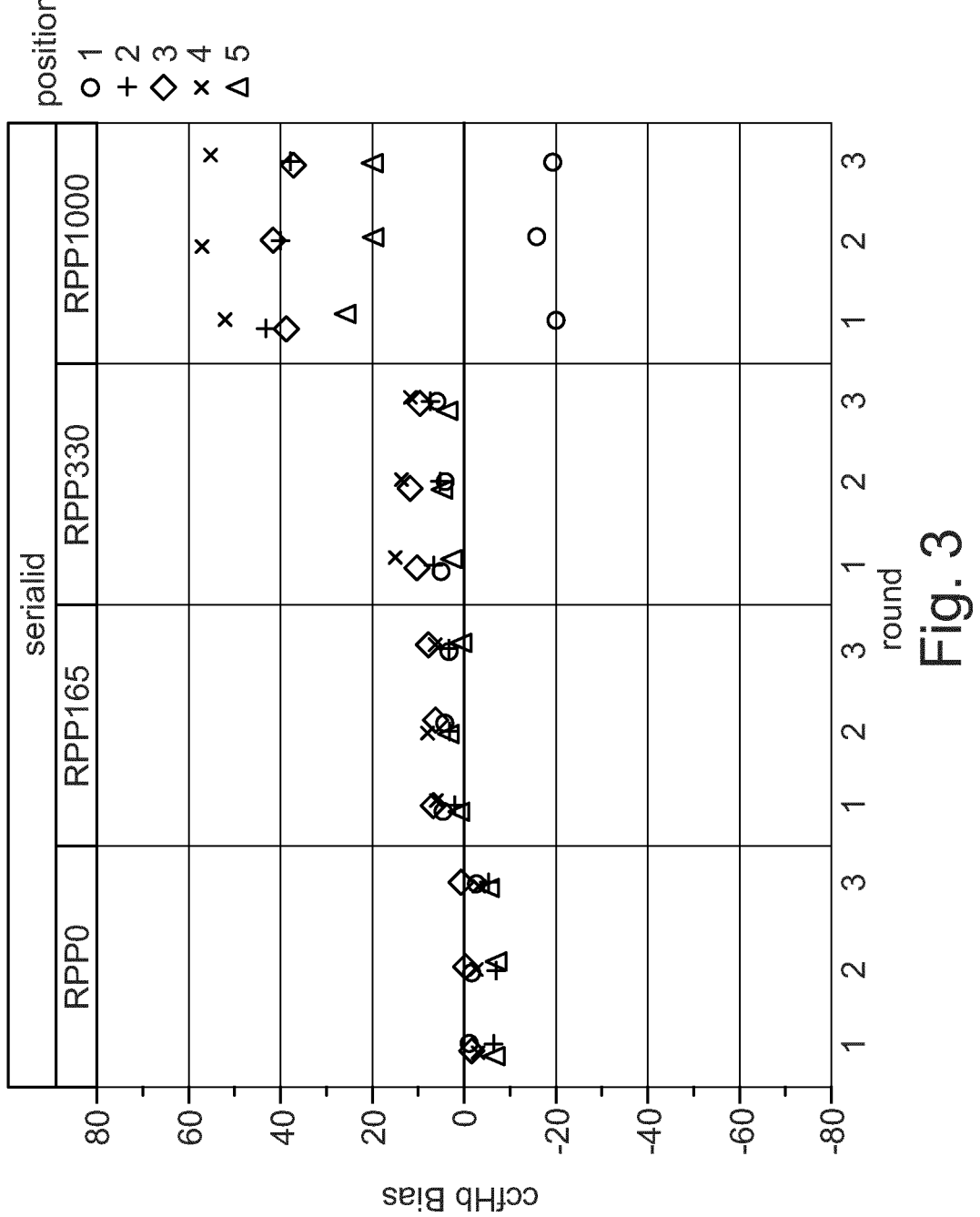
Figure 4:
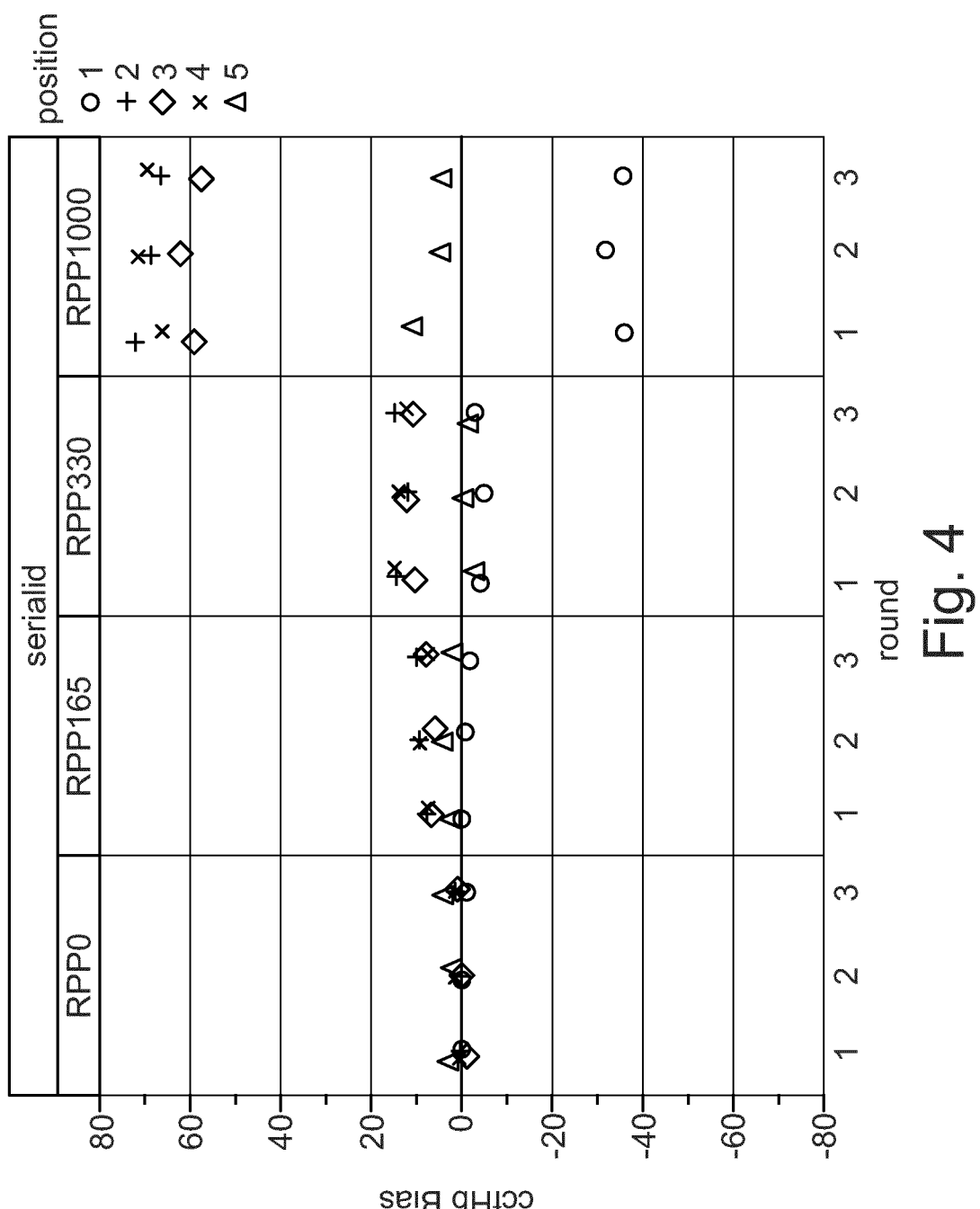
Figure 5:
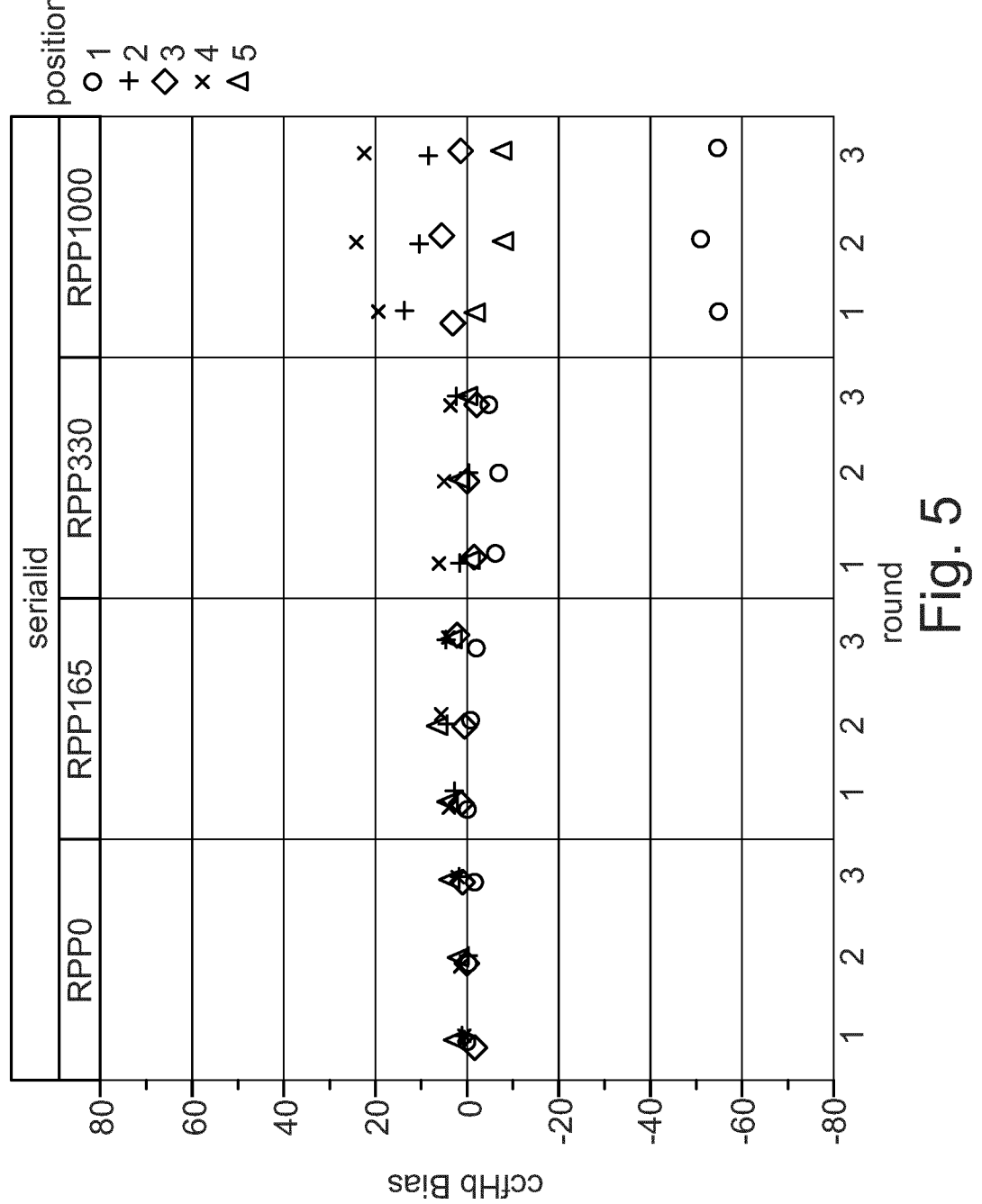
Figure 6:
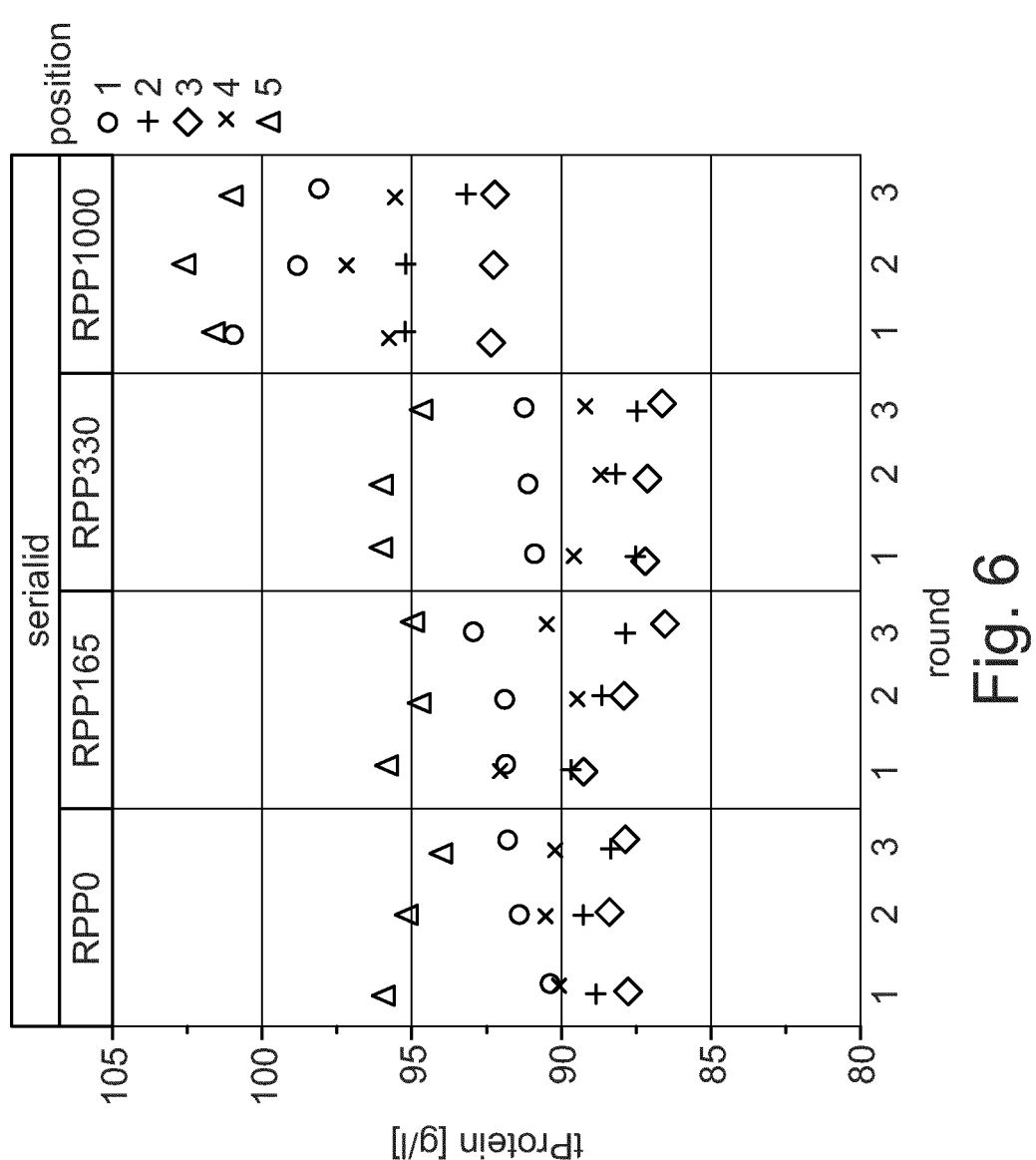
Figure 7:
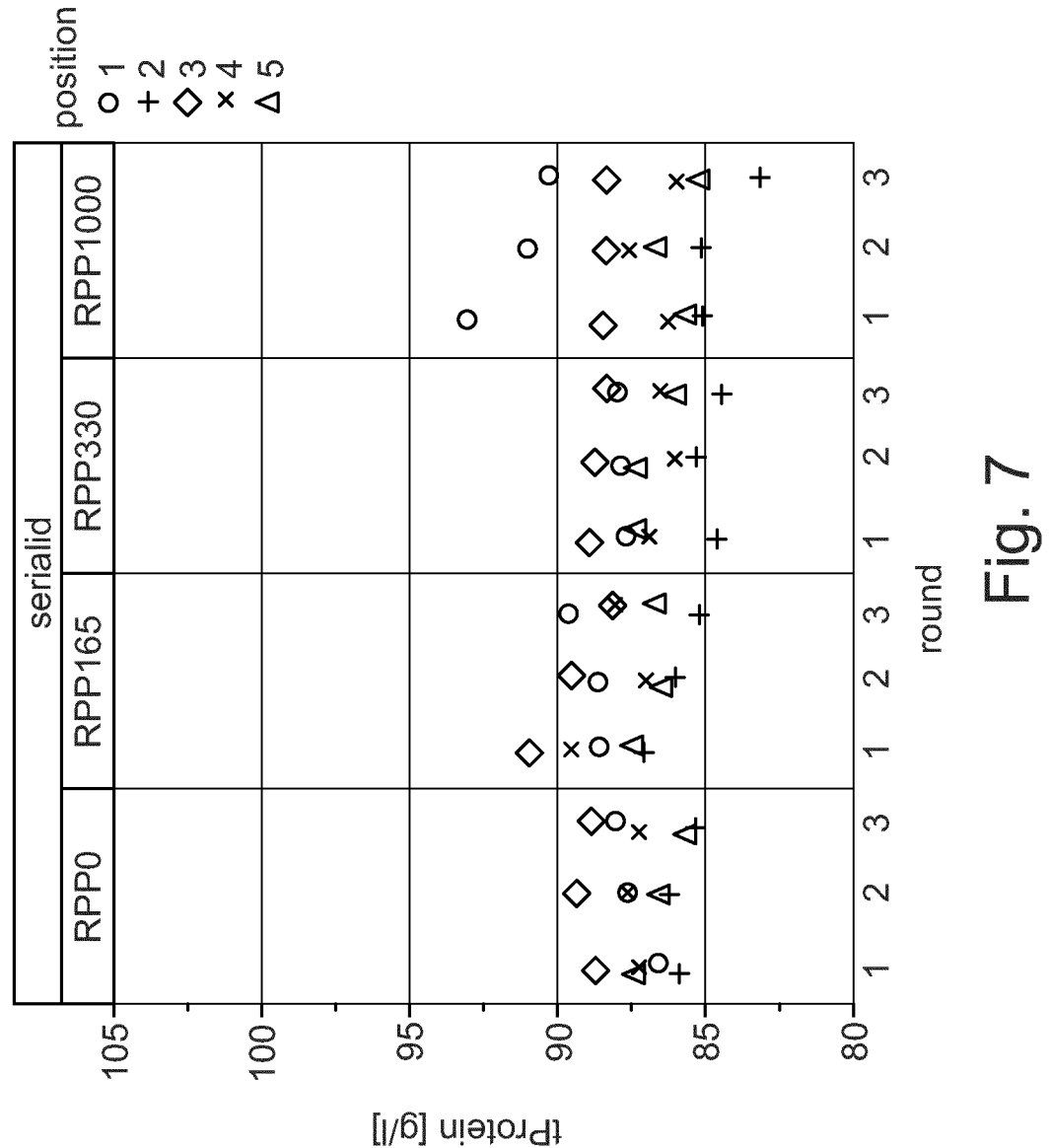

In the following, preferred embodiments are described with reference to the drawing, wherein:

FIG. 1 illustrates a system according to an embodiment of the invention,

FIG. 2 illustrates calibration with a fluid with a predetermined refractive index and a fluid with a known absorption at 4 wavelengths, FIG. 3 illustrates the performance of 5 analyzers when calibrated with a usual optical absorption based calibration fluid, FIG. 4 illustrates the performance of the 5 analyzers when calibrated with a fluid having a predetermined refractive index, FIG. 5 illustrates the performance of the 5 analyzers when calibrated with both a fluid having a predetermined refractive index and a usual optical absorption based calibration fluid, FIG. 6 illustrates the estimated total protein of 5 analyzers when calibrated with a usual optical absorption based calibration fluid and FIG. 7 illustrates the estimated total protein of 5 analyzers when calibrated with a fluid having a predetermined refractive index.

In FIG. 1, a measuring set-up 10 is seen comprising a sensing element 12, which may be a translucent slab, comprising a plurality of dead end pores 122 into which a fluid may travel from a flow channel or flow F.

The pores may be provided in any manner, such as by etching. Methods exist by which the surface of the element 12 is altered at a number of locations, so that when providing the material in an etching solution or fluid, the material will be etched and pores will be formed at these locations, whereas the surface will be maintained and no substantial etching will be seen at other locations. By some methods the positions of the pores will be stochastic, such as when the affecting of the surface is provided using charged particles or ions. By other methods, such as using lithography, the surface may be affected at locations provided in a pattern, whereby the pores may be positioned in a pattern.

The depth and width of the pores may be controlled by the etching parameters.

In one embodiment, the translucent slab or element 12 is made of a translucent, preferably transparent, polymer material and has track-etched dead end pores 122 with an essentially circular cross-section. The pores have an opening 126 with a diameter of 400 nm and a depth of 25 µm distributed with a porosity of 15% by volume. Together, the pores distributed over a given front side 124 surface area A have a total volume V and have an equivalent pore volume depth DELTA=V/A, which may be 1-100 µm, such as 1-50 µm, such as 1-25 µm, such as 1-10 µm, such as 2-6 µm, such as about 4 µm.

In one embodiment, the front side 124 is further provided with a mirroring surface. For example, this surface may obtained by a directional sputter evaporation of Pd onto the front side of a translucent polymer slab 12 with a direction of evaporation at an angle of inclination of 25 degrees with respect to the surface normal on the front side 124, until a reflective layer (not illustrated) with a thickness of 30 nm on the front side 124 of the translucent slab 12 is obtained. Then, the pores may be formed as described.

In some embodiments, the pores can be crisscrossing and at least some of the pores may thus be connected to each other forming an X-shape, a Y-shape, a V-shape, or similar interconnected shapes. In other embodiments, the pores, or most of the pores, extend more or less parallel to each other from one surface and into the material of the element 12.

A radiation emitter 14 is provided for launching radiation toward and through the pores 122 where the radiation interacts with the fluid therein. The radiation being controlled by a controller 18. This radiation also interacts with the fluid 130 at the interface between the pore and the fluid 130. Thus, the refractive index of the fluid 130 takes part in the interaction of the radiation with the fluid 130.

One or more radiation receivers or detectors 16 are provided for receiving launched radiation having interacted with the fluid in the pores.

Preferably, the radiation launched into the element 12 is at a non-zero angle to a normal to the upper or lower surfaces 124/125 or a common direction of the pores. In addition, or alternatively, radiation detected by the detector may be received from a direction being at an angle to a normal to the upper or lower surfaces or a common direction of the pores.

The pores receiving the radiation from the emitter and the pores finally reflecting or directing the radiation toward the detector may be the same, have an overlap or form to different groups of pores. It may be desired that radiation is reflected off multiple pores before being detected. This may be obtained by ensuring that the pores on to which the radiation from the emitter is launched, are not in the field of view of the detector.

The pores 122 open to the surroundings at the first side 124 of the element 12. The radiation may be launched into the element 12 at the opposite side 125. Also, the detector 16 may be positioned so as to receive radiation exiting the element 12 at the surface 125, so that a fluid, for example, may be introduced into the pores from the first side 124. This surface may form part of a flow path of the fluid, by the fluid may be provided into the pores and from which the fluid may be removed again from the pores, such as when replaced by another fluid.

As usual, if the fluid absorbs part of the radiation, the radiation received by the detector 16 will be reduced. From the damping or absorption of the radiation, the concentration of the absorbing element in the pores may be determined.

However, other parameters of the fluid may be determined. It is noted that the difference in refractive index between the material of the sensing element forming the pores 122 and the fluid will convert the pores into lens-like structures. Then, the parameters of these lens-like structures will change with changing refractive index of the fluid.

Therefore, the beam of radiation launched through the lens-like structures will experience different focusing, scattering, reflection and dispersion for different refractive indexes of the lens-like structures, caused by the differing refractive indexes of different fluids.

The radiation received by the detector thus may both depend on the refractive index and any absorption of the fluid.

The pores are provided in the sensing element 12. Thus, portions of the sensing element 12 are provided between neighbouring pores. At the openings 126, the sensing element may form a plane, but porous, surface 124 illustrated by a broken line. These plane outer portions between pores may act to reflect radiation impinging there-on from the sensing element 12, so that this radiation (or part thereof) is reflected back into the sensing element 12. As described above, this surface may even be provided with a reflecting surface to increase such reflection. However, it may be preferred that the detector 16 is not positioned so as to receive any radiation from such direct reflection of radiation directly from the emitter 14.

In addition, or alternatively, a first area or volume of the sensing element 12 may receive radiation directly from the light source 14. The first area or volume of the sensing element 12 may be an area or volume present in a field of view of optics launching or directing the radiation onto and into the element 12. Similarly, a second area or volume of the sensing element 12 may be that from which the detector 16 receives radiation directly from. The second area or volume may be the area or volume of the sensing element 12 present in a field of view of optics collecting or directing the radiation toward the element detector 16.

Rays of radiation may cross each other without interfering, so the areas or volumes may be positioned so that radiation fed toward one volume may pass the radiation from another area directed toward the detector.

It may be desired that the first and second areas or volumes are different, such as have little or no overlap. It may be desired that no more than 25%, such as no more than 10%, such as no more than 5%, such as no more than 1% of all surfaces of the pores 12 in the first area/volume are present also in the second area/volume. Alternatively, the first and second areas/volumes may have a large overlap, such as one being fully comprised in the other.

A calibration may now be made in a novel manner.

In one manner, the structure may be used for determining a refractive index of an unknown fluid. In another manner, the structure may use the refractive index for calibrating an absorption determination, and thus a determination of a concentration of an absorbing component, of a fluid, the refractive index of which is known.

In general, a first fluid or reference fluid having a first refractive index is fed into the pores. The fluid may be a gas or a liquid. It may be preferred that ambient air is used. Ambient air has a refractive index far from that of liquids, which may be an advantage.

When the first/reference fluid is in the pores, a first detection of a radiation intensity, such as at a first wavelength or within a first wavelength interval, is made. If the reference fluid has no or very little absorption at the first wavelength, the contribution detected is due to only or mainly the refractive index of the fluid and its effect on the lens-like structures defined by the fluid in the pores. If the reference fluid absorbs at that wavelength, the contribution thereof may be taken into account.

Naturally, radiation at multiple wavelengths or within multiple wavelength intervals may be launched into the element 12. The effect of the refractive index of the reference fluid may be assumed to be the same for all wavelengths, even though it varies slightly, so that the effect of the absorption at the different wavelengths/intervals may be used for determining and separating the contribution from the absorptions and the refractive index.

Then, or before feeding the first/reference fluid to the pores, a second fluid is introduced into the pores and radiation again launched on to the pores and radiation detected.

If the refractive index of the second fluid is predetermined or known, the first and second fluids may now form a calibration set for the determination of a refractive index of a third fluid fed to the pores.

Clearly, the fluids may also show absorption at one or more of the wavelengths, but as long as sufficient determinations are made (such as at a sufficient number of wavelengths), such contributions may be compensated for in the calibration.

On the other hand, even the second fluid may be a fluid with an unknown concentration of an absorbing element if the refractive index of the second fluid is known and if the absorption of the first fluid at the one or more wavelengths is known. In this situation, the calibration using the first fluid may again suffice when a sufficient number of wavelengths are used to allow determination of both the absorption of the component and the refractive index of the second fluid. If a wavelength is used at which the loss of radiation due to absorption may be determined, the effect of the refractive index of the fluid may be determined. This effect may be an increase or a decrease in received radiation intensity, and this effect may be assumed to be the same for all wavelengths at least within a broad range. The refraction at an interface between two materials of different refractive indexes is wavelength dependent but not to any significant degree within a wavelength range of several hundred nm.

The concentration of multiple components may be determined when a sufficient number of wavelengths are used which are selected so that the components absorb differently in the wavelengths.

EXAMPLE

In a sensing element as described above, different reference fluids have been tested for a set of measurements at 4 different wavelengths, WL1, WL2, WL3 and WL4, used for determining blood plasma parameters. Two calibrations are compared performed on the same 10 analyzers and running 4 fluids with different degrees of hemolysis, with 3 replicates of each sample type.

The first calibration fluid (marked by O in FIG. 2) is a standard coloured calibration fluid. The refractive index of the usual calibration fluid is close to that of blood plasma (1.33).

The second calibration fluid (marked by + in FIG. 2) is a 1500 mM Glucose solution having only a very small absorption at the wavelengths but creating scattering/reflection due to its refractive index, which is 1.41.

In FIG. 2, the signal is seen as increasing until it reaches a steady state value. This is due to the fluid taking a little time to enter the pores, as diffusion is used in the present analyzer.

The radiation intensity change is determined in the normal unit of pure absorptions—mAbs.

It is seen from the very low intensity change that the sum of scattering and absorption of the usual calibration fluid is very low at two of the wavelengths (WL3 and WL4). This is due to the calibration fluid does neither absorb or scatter any of this radiation. Thus, calibration of the wavelengths WL3 and WL4 would historically be performed based on the measurements at WL1 and/or WL2. The sensitivity of WL3 and WL4 could be assumed to be that of WL2, for example.

In contrast, the second calibration fluid has a high intensity change at all four wavelengths. Here, the contribution is mainly caused by the change in interaction of the radiation at the interface between the pores and the fluid—and thus by the refractive index difference between the fluid and the reference fluid (in this case a fourth fluid).

In this situation, it is worth noting that the cross section of the pores, perpendicular to a longitudinal axis thereof, is comparable to the wavelength of the radiation, so that the interaction between the radiation and the pores comprises scattering. The radiation thus, will be scattered from pore to pore until directed out of the element 12. When interacting at a pore, the radiation will also experience the fluid and thus experience absorption if the fluid absorbs the radiation. The lower intensity change of the second fluid at WL1 compared to the same fluid intensity change at WL2 is caused by a lower refractive index change sensitivity at WL1 compared to WL2. The same ratio is observed when utilizing the optically absorbing calibration fluid (Cal1), this is not directly evident in FIG. 2, but it is caused by an approximately 1.25 times higher extinction coefficient of Tartrazine at WL1 compared to WL2. Thus, surprisingly absorption sensitivity ratios between WLs can be transferred to scattering sensitivity ratios between the same WLs and wise versa.

In addition to the absorption of the usual calibration fluid, radiation will also be lost due to the scattering by the pores. This effect depends on the refractive index of the fluid.

Thus, a comparison may be made between calibrating 5 analyzers with the first calibration fluid, with the second calibration fluid and with both fluids.

FIG. 3 illustrates the calibration of 5 analyzers (each illustrated by one of the symbols to the right) using the standard calibration fluid where after 4 fluids, RPP0, RPP165, RPP330 and RPP1000) are measured 3 times on each analyser, resulting in each of the markings under each fluid.

RPP is the so-called "Reference Plasma Pool" which are based on blood samples in which hemolysis has released all colour from the red blood cells. Thus, an RPP1000 sample has 1000 mg/dl of free hemoglobin (also called ccfHb) dissolved in the plasma. As the fluids are based on blood, the protein concentration and the RI thereof is the same for all RPP fluids.

It is seen that the RPP0 measurements are not, as they should be, at zero. This is caused by the scattering caused by the refractive index of the fluid. Also, it is seen that performance at RPP1000 in mg/dL ccfHb is worse.

In FIG. 4, the same fluids have been analysed using the second calibration fluid. It is seen that the RPP0 measurements are now provided at the zero value as expected.

It is also seen that the calibration works suitably at the RPP165 and RPP330 fluids, where it is not improved at the RPP1000 fluid as the RI calibration is not ideal for calibrating the colour signal from cfHb.

In FIG. 5, the 5 analyzers have been calibrated using both the first and the second calibration fluids and it is seen that the best of the two calibrations is obtained. The better performance on the RPP0, RPP165 and RPP330 fluid is seen from the second calibration fluid and the better performance at the RPP1000 fluid is seen from the first calibration fluid.

Instead of a measurement determining the concentration of a component using radiation absorption, the concentration of a component may be estimated from a refractive index of the fluid. For example, protein in blood plasma does not absorb to any significant degree at any of WL1-WL4 but the concentration of the protein in the plasma will define the refractive index thereof.

In FIG. 6, the 5 analyzers calibrated with the first calibration fluid have been used for estimating the total protein in each of the fluids RPP0, RPP165, RPP330 and RPP1000. As a comparison, FIG. 7 illustrates the same analyzers analysing the same fluids but now calibrated using the second calibration fluid. It is seen that the measurements have a better performance when using both calibrations.

The invention claimed is:

1. A method for determining a refractive index of a fluid, the method comprising steps of:
   a) obtaining a first optical signal from a sensing element having a plurality of pores comprising a first fluid having a first predetermined refractive index and predetermined first absorptions at at least a first and a second wavelength,
   b) obtaining a second optical signal from the sensing element, where the pores comprise a second fluid having predetermined second absorptions at the at least first and second wavelengths and a second, predetermined refractive index, the second refractive index being different from the first refractive index,
   c) obtaining a third optical signal from the sensing element, where the pores comprise a third fluid, and
   d) determining a refractive index of the third fluid based on the first, second and third optical signals, the first and second predetermined absorptions and the first and second refractive indexes.

2. A method for determining a parameter of a fluid, the method comprising steps of:
   a) obtaining a first optical signal from a sensing element having a plurality of pores comprising a first fluid having a first predetermined refractive index and a predetermined absorption at at least one of one or more wavelengths,
   b) obtaining a second optical signal from the sensing element, where the pores comprise a second fluid having a second predetermined refractive index, the second refractive index being different from the first refractive index, and
   c) determining, based on the first and second optical signals, the first and second refractive indexes, and the predetermined absorption, a concentration of a component of the second fluid, the component absorbing radiation at at least one of the one or more wavelengths.

3. The method according to claim 1, wherein the third fluid comprises a concentration of a substance, and wherein step d) further comprises determining a concentration of the substance in the third fluid.

4. The method according to claim 1, wherein the second refractive index is at least 1.05 times the first refractive index.

5. The method according to claim 1, wherein the first fluid is a gas.

6. The method according to claim 1, wherein each of steps a), b) and c) comprise:
   launching radiation at each of the first and second wavelengths to the sensing element and determining an intensity of radiation at each of the first and second wavelengths from the sensing element and
   wherein d) is performed based also on the determined intensities.

7. The method according to claim 2, wherein steps a) and b) comprise:

launching radiation at the at least one wavelength and at another wavelength to the sensing element and determining an intensity of radiation at the at least one wavelength and the other wavelength from the sensing element and wherein c) is based also on the determined intensities.

8. A system for determining a refractive index of a fluid, the system comprising:

a sensing element having a plurality of pores, a controllable radiation provider configured to launch radiation of one or more wavelengths toward the pores, a detector configured to detect launched radiation reflected and/or scattered by the pores and output corresponding information, a controllable fluid providing element configured to provide fluid to the pores, and a controller configured to control the radiation provider and the fluid providing element and to:

control the detector to obtain a first optical signal when the pores comprise a first fluid having a predetermined first refractive index and predetermined first absorptions at at least a first and a second wavelength, control the detector to obtain a second optical signal when the pores comprise a second fluid having predetermined second absorptions at at least the first and second wavelengths and a second predetermined refractive index, the second refractive index being different from the first refractive index, control the detector to obtain a third optical signal when the pores comprise a third fluid, and determine a refractive index of the third fluid, based on the first, second and third optical signals, the first and second absorptions, and the first and second refractive indexes.

9. A system for determining a parameter of a fluid, the system comprising:

a sensing element having a plurality of pores, a controllable radiation provider configured to launch radiation of one or more wavelengths toward the pores, a detector configured to detect launched radiation reflected by the pores and output corresponding information, a controllable fluid providing element configured to feed fluid to the pores, and a controller configured to control the radiation provider and the fluid providing element and to:

control the detector to obtain a first optical signal when the pores comprise a first fluid having a predetermined first refractive index and a predetermined first absorption at at least one of one or more wavelengths, control the detector to obtain a second optical signal when the pores comprise a second fluid having a second predetermined refractive index, the second refractive index being different from the first refractive index, and determine, based on the first and second optical signals, the predetermined first absorption as well as the first and second refractive indexes, a concentration of a component of the second fluid, the component absorbing radiation at at least one of the one or more wavelengths.

10. The system according to claim 8, wherein the controller is configured to determine, in the determination, a concentration of a substance in the third fluid.

11. The system according to claim 8, wherein the second refractive index is at least 1.05 times the first refractive index.

12. The system according to claim 8, wherein the fluid providing element comprises a plurality of fluid containers and a flow path from each fluid container to the pores.

13. The system according to claim 8, wherein the first fluid is a gas.

14. The system according to claim 8, wherein the controller is configured to:

a) control the radiation provider to launch radiation at each of the first and second wavelengths to the sensing element, b) control the detector to determine:

i) as at least part of the first optical signal, a first intensity of radiation at each of the first and second wavelengths from the sensing element, and ii) as at least part of the second optical signal, a second intensity of radiation at each of the first and second wavelengths from the sensing element, and c) determine the refractive index based also on the determined first and second intensities.

15. The system according to claim 9, wherein the controller is configured to:

a) control the radiation provider to launch radiation at the at least one wavelength and at another wavelength to the sensing element, b) control the detector to determine:

i) as at least part of the first optical signal, a first intensity of radiation at the at least one wavelength and at the other wavelength from the sensing element, and ii) as at least part of the second optical signal, a second intensity of radiation at the at least one wavelength and at the other wavelength from the sensing element, and c) determine the component based also on the determined intensities.

\* \* \* \* \*